United States Patent
Bhattacharjya

(10) Patent No.: US 7,174,049 B2
(45) Date of Patent: Feb. 6, 2007

(54) IMAGE UPSCALING BY JOINT OPTIMIZATION OF LOW AND MID-LEVEL IMAGE VARIABLES

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 799 days.

(21) Appl. No.: 10/316,767

(22) Filed: Dec. 11, 2002

(65) Prior Publication Data

US 2004/0114826 A1    Jun. 17, 2004

(51) Int. Cl.
*G06K 9/40*  (2006.01)

(52) U.S. Cl. ............ 382/274; 382/175; 382/176; 382/275; 358/3.26; 358/464; 348/586; 348/607

(58) Field of Classification Search ........ 382/260, 382/264, 274, 275, 175, 176; 348/586, 607; 345/640; 358/3.26, 3.27, 464
See application file for complete search history.

(56) References Cited

U.S. PATENT DOCUMENTS

| | | | | |
|---|---|---|---|---|
| 5,225,190 A | * | 7/1993 | Halloran et al. ........ | 424/70.121 |
| 5,343,390 A | * | 8/1994 | Doi et al. .................. | 382/132 |
| 5,465,463 A | * | 11/1995 | Lautenschlager ............ | 16/236 |
| 5,585,926 A | * | 12/1996 | Fujii et al. ................... | 358/471 |
| 5,633,511 A | * | 5/1997 | Lee et al. .................... | 250/587 |
| 5,663,772 A | * | 9/1997 | Uehara et al. .............. | 348/671 |
| 5,694,493 A | * | 12/1997 | Tuli .......................... | 382/270 |
| 5,740,268 A | * | 4/1998 | Nishikawa et al. ......... | 382/132 |
| 5,900,953 A | | 5/1999 | Bottou et al. | |
| 5,956,470 A | | 9/1999 | Eschbach | |
| 5,995,145 A | * | 11/1999 | Viliesid ...................... | 348/362 |
| 6,148,103 A | * | 11/2000 | Nenonen .................... | 382/169 |
| 6,259,822 B1 | | 7/2001 | Hamilton, Jr. et al. | |
| 6,334,001 B2 | | 12/2001 | de Queiroz et al. | |
| 6,806,980 B2 | * | 10/2004 | Xu et al. .................... | 358/474 |

* cited by examiner

*Primary Examiner*—Jingge Wu
*Assistant Examiner*—Yosef Kassa

(57) ABSTRACT

An image upscaling algorithm jointly optimizes estimating pixel color, classifying it into one of multiple regions, and estimating region boundaries subject to region continuity and edge-configuration constraints. The joint solution of constraints at multiple levels of image abstraction leads to improved image reconstruction quality. The algorithm involves subdividing the image signal into multiple distinct regions, including an upper region and a lower region, and at least one transition zone between the upper and lower regions; constructing a plurality of separate curves, one for each region; smoothing each curve independently of the other curves; and reconstructing the image signal from the smoothed curves such that the reconstructed image signal has no segment in any transition zone.

10 Claims, 7 Drawing Sheets

IMAGE UPSCALING BY JOINT OPTIMIZATION OF LOW AND MID-LEVEL IMAGE VARIABLES

BACKGROUND OF THE INVENTION

1. Field of the Invention

The present invention relates to a global optimization algorithm for upscaling images that have a few distinct colors to improve the quality of such images. The invention is particularly useful for improving the quality of dark (e.g., black) text/graphics on a light (e.g., white) background, especially small-font/thin text or thin-lined graphics. The algorithm of the present invention may be embodied in a method, an apparatus such as a computer, or as a program of instructions (e.g., software) carried on a machine-readable medium.

2. Description of the Related Art

Scaling an image involves generating a new image that is larger or smaller than the original. Scaling has many applications in scanners, printers, and photo-finishing systems, and digital cameras. In the case of upscaling, the new image is larger; that is, the new image has more pixels in the horizontal and/or vertical directions than the original image. Thus, in upscaling new pixels must created.

Some conventional image upscaling methods include a smoothing operation in conjunction therewith. However, such methods do not, for example, jointly optimize estimating pixel color, classifying it into one of a plurality of regions, and estimating region boundaries subject to region continuity and edge-configuration constraints. As the inventor herein has discovered, the joint solution of constraints at multiple levels of image abstraction leads to improved image reconstruction quality.

OBJECTS AND SUMMARY OF THE INVENTION

Object of the Invention

It is therefore an object of the present invention to provide an image upscaling algorithm that improves image reconstruction quality.

It is a further object of this invention to provide an image upscaling algorithm that is particularly effective at improving the quality of images containing small-font/thin text and/or thin-lined graphics.

Summary of the Invention

According to one aspect of this invention, a method for processing an image signal is provided. The method comprises the steps of: (a) subdividing the image signal into a plurality of distinct regions, including an upper region and a lower region, and at least one transition zone between the upper and lower regions; (b) constructing a plurality of separate curves, one for each region; (c) smoothing each curve independently of the other curves; and (d) reconstructing the image signal from the smoothed curves such that the reconstructed image signal has no segment in any transition zone.

In step (a), preferably the at least one transition zone comprises a transition zone directly between the upper and lower regions; and in step (b) the constructing of the plurality of separate curves preferably comprises identifying each location where the image signal crosses an upper boundary dividing the upper region and the transition zone and identifying each location where the image signal crosses a lower boundary dividing the transition zone and the lower region.

In step (b), preferably the curve in the upper region assumes the signal value when the signal is in the upper region and assumes the value of the upper boundary when the signal is in either the transition zone or the lower region, and the curve in the lower region assumes the value of the lower boundary when the signal is in either the upper region or the transition zone and assumes the signal value when the signal is in the lower region.

Preferably, the reconstructing of the image signal in step (d) further comprises applying a cutting function to the smoothed curves at a location within each interval where the image signal is in the transition zone.

In another aspect, the invention involves an apparatus for processing an image signal. The apparatus comprises: means for subdividing the image signal into a plurality of distinct regions, including an upper region and a lower region, and at least one transition zone between the upper and lower regions; means for constructing a plurality of separate curves, one for each region; means for smoothing each curve independently of the other curves; and means for reconstructing the image signal from the smoothed curves such that the reconstructed image signal has no segment in any transition zone.

Preferably, the at least one transition zone comprises a transition zone directly between the upper and lower regions. Additionally, the means for constructing is preferably configured to identify each location where the image signal crosses an upper boundary dividing the upper region and the transition zone and identify each location where the image signal crosses a lower boundary dividing the transition zone and the lower region.

Preferably, the means for constructing is configured to construct the plurality of separate curves such that the curve in the upper region assumes the signal value when the signal is in the upper region and assumes the value of the upper boundary when the signal is in either the transition zone or the lower region, and such that the curve in the lower region assumes the value of the lower boundary when the signal is in either the upper region or the transition zone and assumes the signal value when the signal is in the lower region.

Preferably, the means for reconstructing further comprises means for applying a cutting function to the smoothed curves at a location within each interval where the image signal is in the transition zone.

The inventive algorithm may be embodied in any of a variety of image processing devices, and in that regard the apparatus may comprise a computer, a printer, a photocopier, etc.

In accordance with further aspects of the invention, the above-described method or any of the steps thereof may be embodied in a program of instructions (e.g., software) which may be stored on, or conveyed to, a computer or other processor-controlled device for execution. Alternatively, the method or any of the steps thereof may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Overview

A global optimization algorithm for upscaling images that have a few distinct colors is provided. Examples of such images include scanned pages containing black text/graphics on a white background. The algorithm jointly optimizes estimating pixel color, classifying it into one of a plurality of regions, and estimating region boundaries subject to region continuity and edge-configuration constraints. The joint solution of constraints at multiple levels of image abstraction leads to improved image reconstruction quality.

The algorithm is primarily designed for higher end processing devices. Although somewhat computationally complex, the algorithm produces excellent results. The algorithm is particularly well suited for improving the quality of small and/or thin text.

Figure 5:
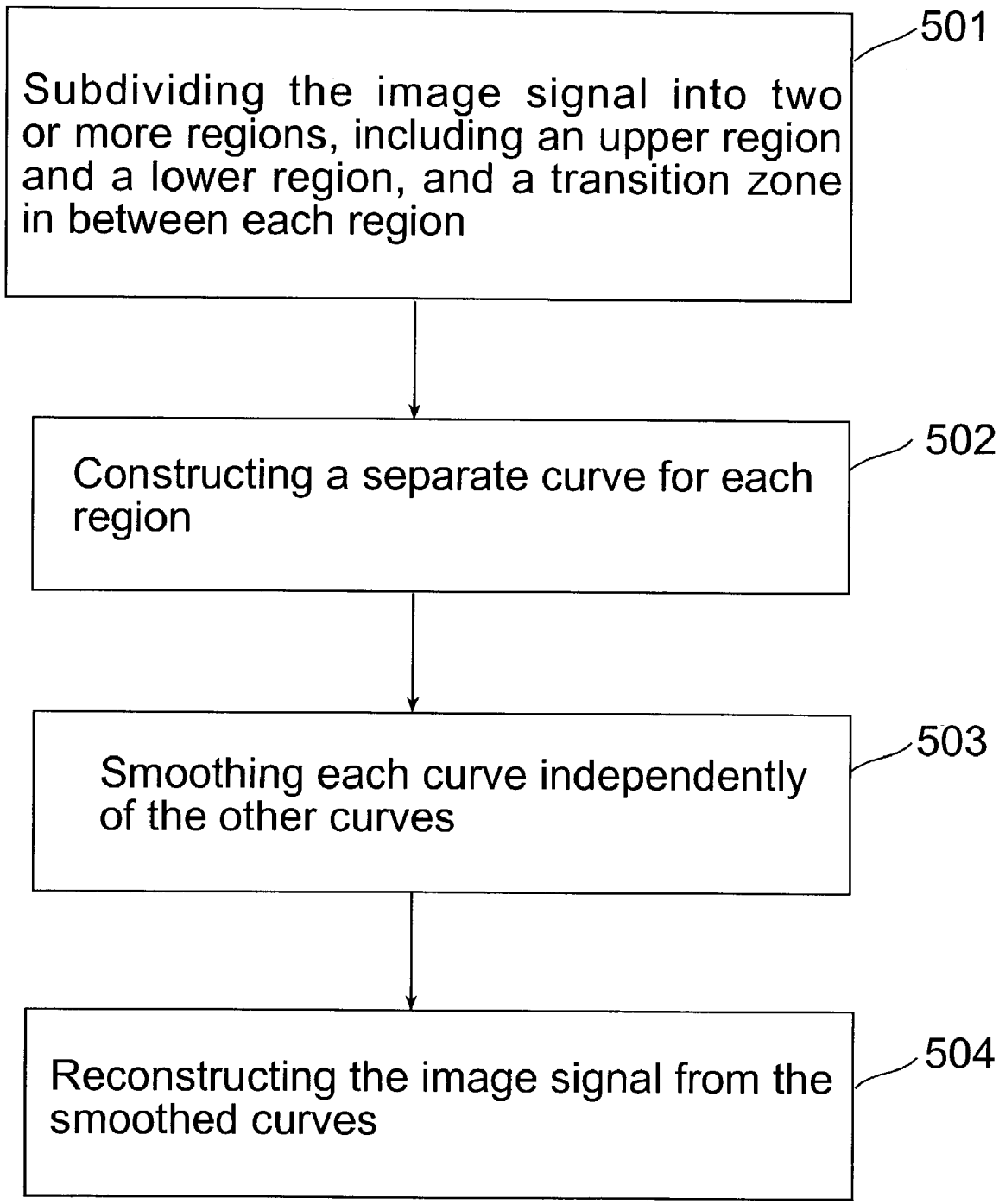
FIG. 5 is a flow chart of the algorithm according to embodiments of the invention.

FIG. 5 is a flow chart illustrating the inventive algorithm. A signal (representing an input image) is subdivided into two or more regions of different intensities, including at least an upper region and a lower region, and one or more transition zones interposed between the distinct regions in alternating arrangement (step 501). In accordance with embodiments of the invention, the data in each region is treated separately.

Figure 1:
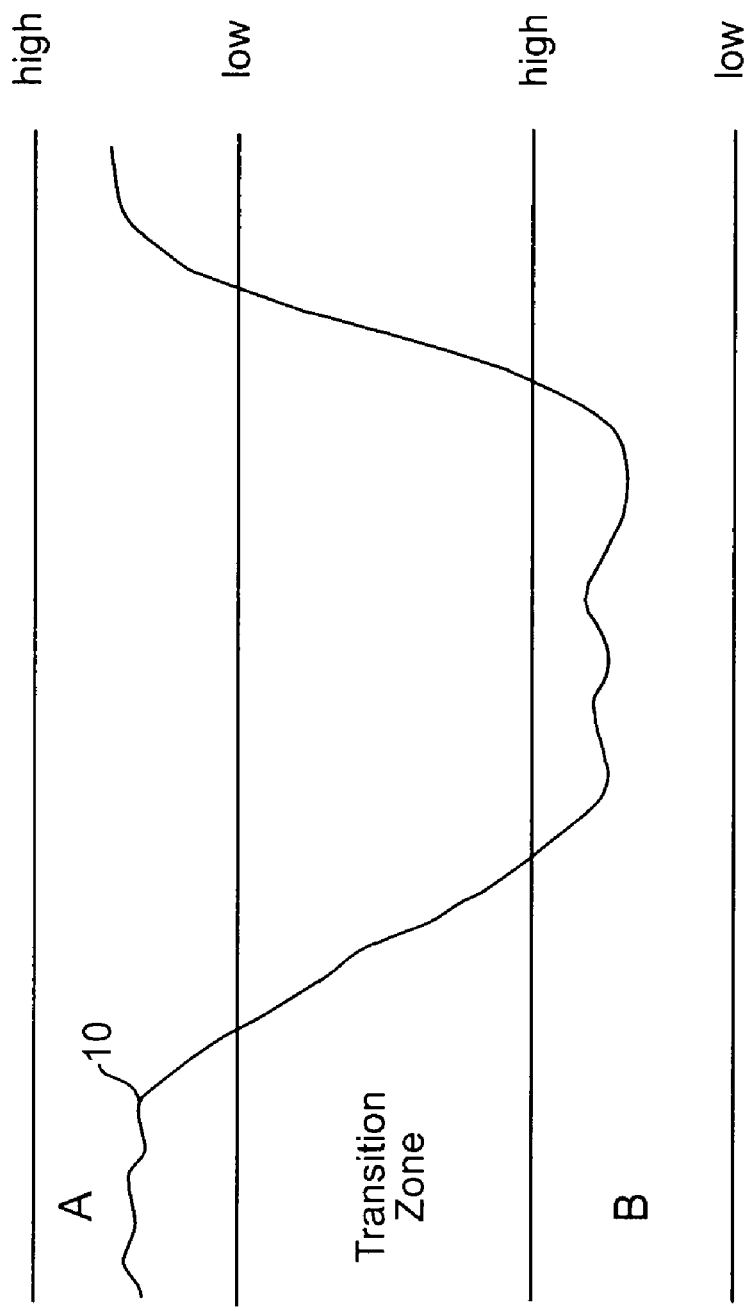
FIG. 1 is a schematic diagram illustrating an image signal, the value of which varies between a plurality of regions and a transition zone.

By way of example, a signal 10 representing an image having two different types of regions, a foreground and a background, separated by a transition zone, is shown in FIG. 1. In the case of dark text on a light background, the foreground region, labeled A, is of higher intensity than the background region, labeled B. The signal for such an image will vary between the regions and transition zone, as shown in the figure. In accordance with the invention, the portion of image signal 10 that lies in region A is processed separately from the portion in region B.

Figure 2:
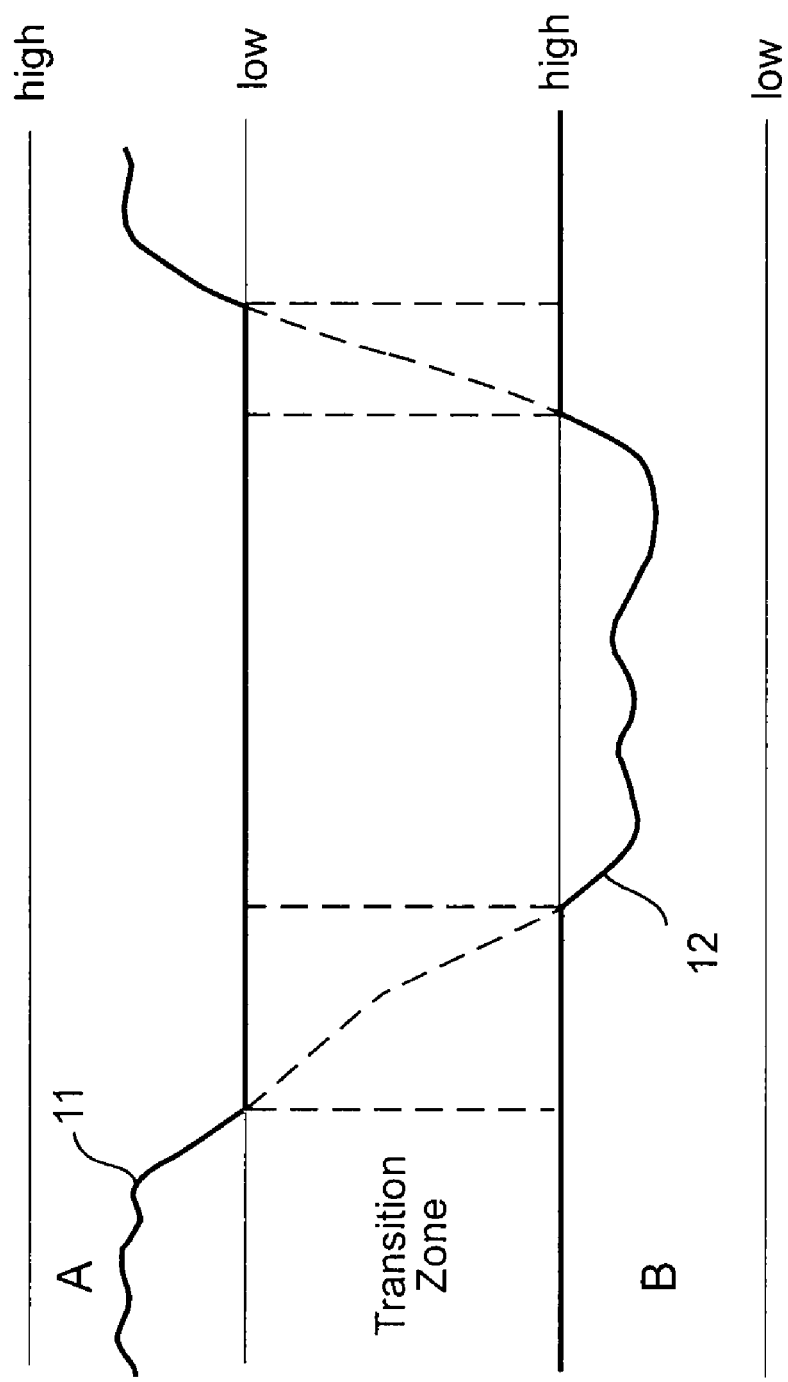
FIGS. 2, 3 and 4 are schematic diagrams, each illustrating certain processing of the image signal in FIG. 1, in accordance with the invention.

Referring again to FIG. 5, in conjunction with FIG. 2, in step 502, separate curves are constructed for each region. In the illustrated embodiment, which contains two regions, two separate curves 11 and 12 are constructed, as shown in FIG. 2. Upper curve 11 takes the signal value when the signal value is in region A and assumes the lower boundary of region A (i.e., the boundary between region A and the transition zone) when the signal is in either the transition zone or region B. Lower curve 12 assumes the upper boundary of region B (i.e., the boundary between region B and the transition zone) when the signal is in either the transition zone or region A and takes the signal value when the signal value is in region B.

Figure 3:
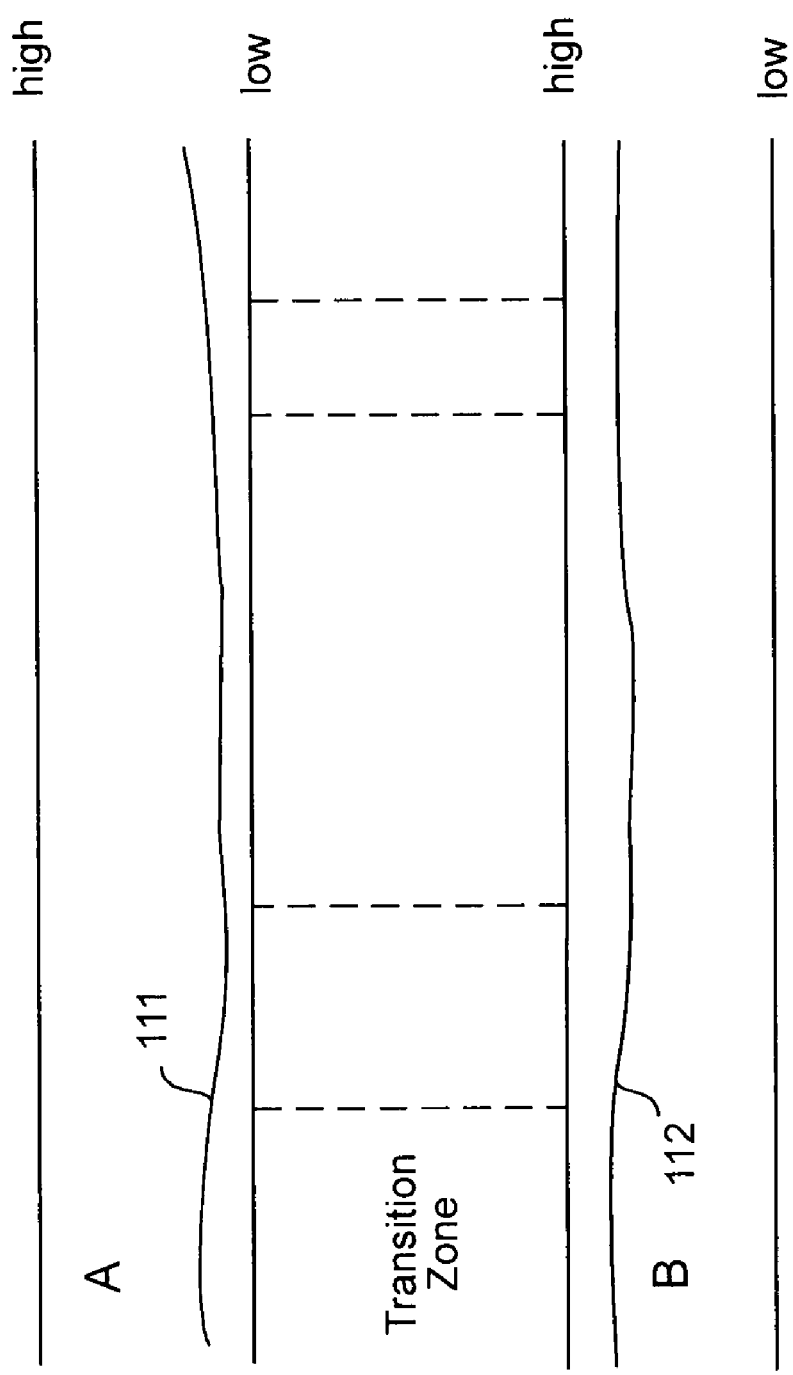

In step 503, the curve in each region is smoothed independently of the other curves. In the illustrated embodiment, upper curve 11 in FIG. 2 is smoothed to generate a smoothed upper curve 111 in FIG. 3, and lower curve 12 in FIG. 2 is smoothed to generate a smoothed lower curve 112 in FIG. 3. The smoothing process is described in further detail below.

Figure 4:
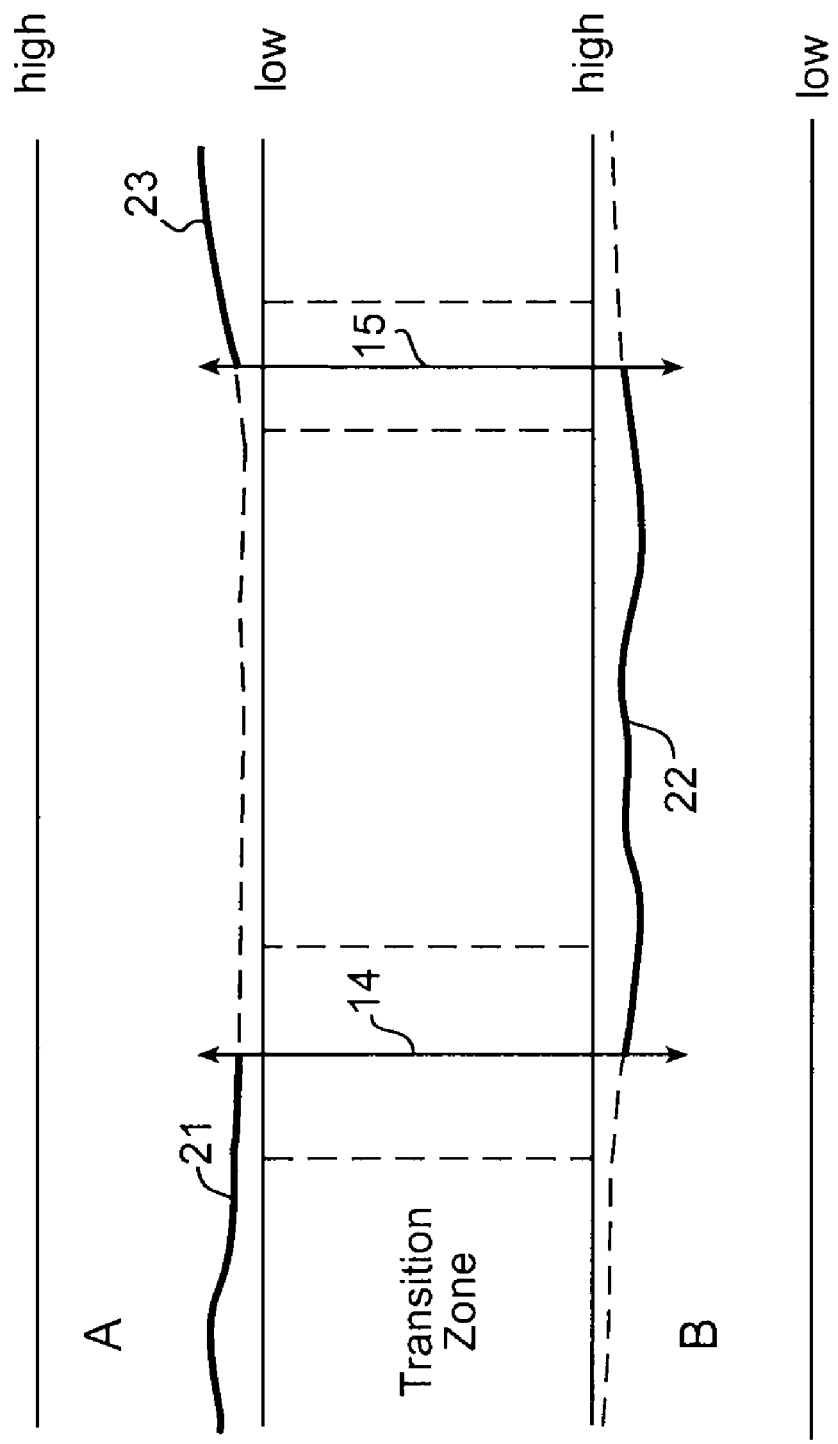

In step 504, a cutting function is employed to reconstruct a smoothed version of the original signal. The details of the cutting function and how it is employed are described in further detail below. Generally, the cut occurs at a location where the original signal is in the transition zone, as shown in FIG. 4. The cut locations in the illustrated embodiment are identified by the double arrows 14 and 15.

After employing the cutting function, a smoothed reconstructed version of the original signal is formed in step 505, as shown in FIG. 4. In the illustrated embodiment, the smoothed reconstructed signal comprises a left segment 21 in region A, a middle segment 22 in region B and a right segment 23 in region A, with no segment of the signal in the transition zone.

While the foregoing description, as well as the detailed description that follows, relates primarily to an image having two kinds of regions, e.g., a foreground and a background, it will be understood from this disclosure that the analysis can be, extended to images with multiple regions. In the analysis, each region is assumed to be of uniform intensity but subject to scanner noise and bleedthrough from the reverse side of the page.

Section B presents the image model and a set of priors for the model. Section C presents a method for optimizing the objective function to obtain the upscaled image.

B. The Image Model

The input image is considered to be a realization of a random process characterized by spatially-varying parameters. The parameters of the process are allowed to vary over the range of the image, subject to interval type constraints. Thus, for example, the mean intensity of each type of region in the image is assumed to vary within estimated region-specific intervals. If the mean intensity of each location (i,j) in the image is denoted $\mu_{ij}$ it is assumed that:

$$\mu_{ij}^m \epsilon [\mu_m^{low}, \mu_m^{high}], \quad (1)$$

where m denotes the index of the region at pixel (i,j). Thus, the mean intensity at each pixel may be described as a function of the region-dependent mean as:

$$\mu_{ij} = \sum_m c_{ij}^m \cdot u_{ij}^m, \quad (2)$$

where $c_{ij}^m$ is a soft segmentation label that assumes an extreme value of 1 if the pixel at location (i,j) belongs to region m. The labels $c_{ij}^m$ are constrained to vary in the unit interval (0,1) at each pixel location, and $$\sum_m c_{ij}^m = 1.$$

Closed-form transformations for realizing such constraints are described in the follow publication: B. Roysam and A. K. Bhattacharjya, "Hierarchically-Structured Unit Simplex Transformations for Parallel Distributed Optimization Problems," *IEEE Trans. Neural Networks*, Vol. 3, No. 1, pp.108–114, 1992.

The constraints in Eq. (1) may be realized by the following change of variables:

$$\mu_{ij}^m = \mu_m^{low} + (\mu_m^{hi} - \mu_m^{low}) \cdot f(u_{ij}), \quad (3)$$

where $u_{ij}$ is an unconstrained variable ($u_{ij} \in R$, and $f: R \to (0, 1)$. The function $f$ is often chosen as the sigmoidal function:

$$f(x) = \frac{1}{1 + \exp(-\alpha x)}. \quad (4)$$

Each of the parameters are constrained to vary smoothly within a region. Thus, for the mean $\mu_{ij}$ this constraint is incorporated by introducing the following form of Good's roughness penalty [I. J. Good and R. A. Gaskins, "Density Estimation and Bump Hunting by the Penalized Likelihood Method Exemplified by Scattering and Meteorite Data," *J. Amer. Stat. Assoc.*, Vol. 75, pp. 42–73, 1980]:

$$H_1(\mu_m) = \sum_{ij} |\sqrt{\mu_{i+1,j}^m} - \sqrt{\mu_{ij}^m}|^2 + |\sqrt{\mu_{i,j+1}^m} - \sqrt{\mu_{ij}^m}|^2. \quad (5)$$

After the random processes for generating pixel values have been identified, the next level of image abstraction may be obtained via the image segmentation labels introduced in Eq. (2). A simple constraint that is applicable to segmentation labels expresses object continuity. The simplest continuity constraint penalizes single-pixel islands or holes as represented by a label configuration such as 101 or 010. This can be expressed as a penalty of the form:

$$H_2(c_m) = \sum_{ij} c_{i-1,j}^m (1 - c_{ij}^m) c_{i+1,j}^m + \sum_{ij} (1 - c_{i-1,j}^m) c_{ij}^m (1 - c_{i+1,j}^m) + \quad (6)$$
$$\sum_{ij} c_{i,j-1}^m (1 - c_{ij}^m) c_{i,j+1}^m + \sum_{ij} (1 - c_{i,j-1}^m) c_{ij}^m (1 - c_{i,j+1}^m).$$

Figure 6:
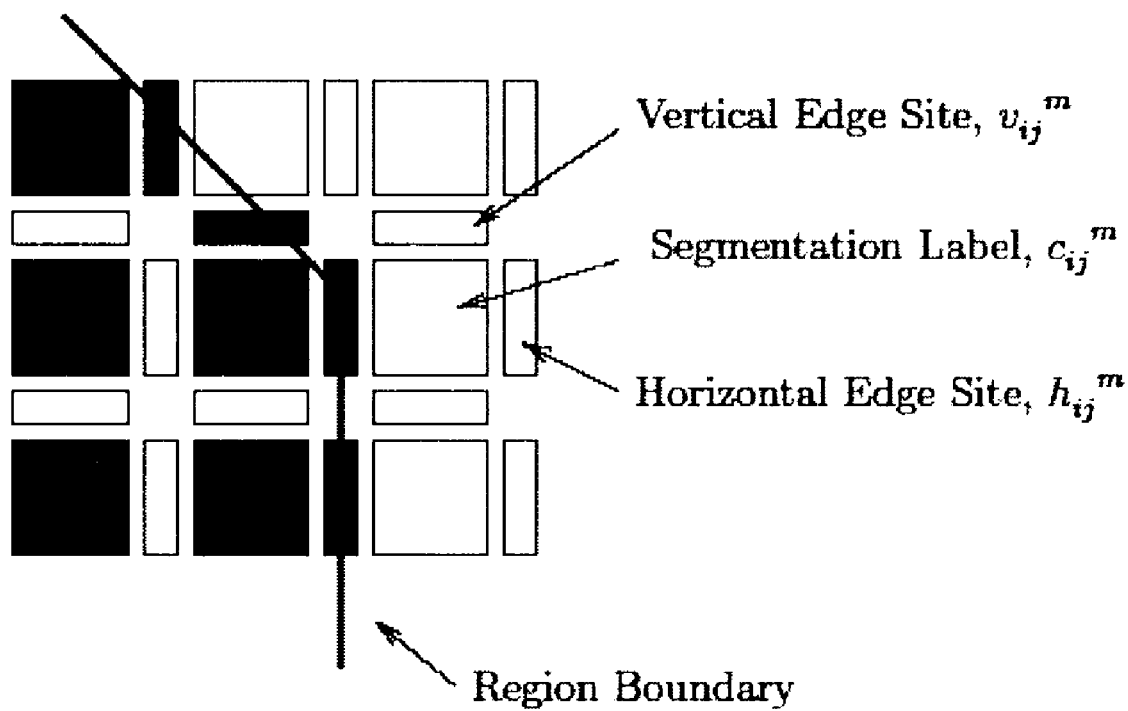
FIG. 6 shows the configuration of segmentation and edge labels with respect to pixels in an image.

Every adjacent pair of segmentation labels is punctuated by soft edge labels in the horizontal and vertical directions. These are denoted $h_{ij}^m$ and $v_{ij}^m$, respectively. FIG. 6 shows the configuration of segmentation and edge labels with respect to pixels in an image. Segmentation labels associated with each pixel are shown as squares. The horizontal and vertical edge-site labels are shown as vertical and horizontal rectangles, respectively. The dark line indicates a hypothetical image region boundary. Shading is used to indicate values for segmentation and edge labels that are consistent with the boundary. The label $h_{ij}^m$ is defined as the exclusive-or of $c_{ij}^m$ and $c_{i+1,j}^m$. Similarly, the label $v_{ij}^m$ is defined as the exclusive-or of $c_{ij}^m$ and $c_{i,j+1}^m$. Following methods outlined in the following publication: Roysam and M. I. Miller, "Mapping Deterministic Rules to Stochastic Representations via Gibbs Distributions on Massively Parallel Analog Networks: Application to Global Optimization," *Proc. 1988 Connectionist Models Summer School*, Morgan Kaufmann Publishers, June 1988, this constraint for $h_{ij}^m$ may be expressed as:

$$H_3(h_m, c_m) = \sum_{ij} (1 - h_{ij}^m)[c_{ij}^m(1 - c_{i+1,j}^m) + (1 - c_{ij}^m)c_{i+1,j}^m] + \quad (7)$$
$$\sum_{ij} h_{ij}^m [c_{ij}^m c_{i+1,j}^m + (1 - c_{ij}^m)(1 - c_{i+1,j}^m)].$$

The constraint for $v_{ij}^m$ may be written in a form analogous to Eq. (7) to yield a penalty term $H_4(v_m, c_m)$.

Edge-site labels are syntactically constrained as set forth in the following publication: S. Geman and D. Geman, "Stochastic relaxation, Gibbs distribution and the Bayesian restoration of images," *IEEE Transactions on Pattern Analysis and Machine Intelligence*, 6(6):721–741, 1984.

Under the assumption that region sizes are never as small as the dimensions of a single pixel, a simple constraint on edge sites forbids the formation of adjacent edge sites across a single pixel. The corresponding Gibbs' penalty term is given by:

$$H_5(h_m, v_m) = \sum_{ij} h_{ij}^m h_{i+1,j}^m + v_{ij}^m v_{i,j+1}^m. \quad (8)$$

C. Joint Optimization

Given the image model of the previous section, a joint optimization for the upscaling problem is formulated below. Let the pixels of the input image be denoted $p_{ij}$ where $i \in \{0, \ldots, I-1\}$ and $j \in \{0, \ldots, J-1\}$. Denote the pixels of the upscaled image by $\hat{p}_{kl}$, where $k \in \{0, \ldots, S \cdot I-1\}$ and $l \in \{0, \ldots, S \cdot J-1\}$, where S is the scaling factor. Assume that $\hat{p}_{kl}$ satisfy the constraints:

$$p_{ij} = \sum_{k,l=0}^{S-1} \hat{p}_{Si+k, Sj+l}, \quad \forall (i, j). \quad (9)$$

This constraint is satisfied by transforming $\hat{p}_{kl}$ as:

$$\hat{p}_{Si+k, Sj+l} = p_{ij} \chi_{Si+k, Sj+l}, \forall (i,j) \text{ and } k,l \in \{0, \ldots, S-1\}, \quad (10)$$

where $\chi_{rt}$ is constrained to the unit interval (0,1), and $$\sum_{k,l=0}^{S-1} \chi_{Si+k, Sj+l} = 1, \quad \forall (i, j). \quad (11)$$

The constraint in Eq. (11) can be incorporated in closed form using the unit-simplex transformation presented in B. Roysam and A. K. Bhattacharjya, "Hierarchically-Structured Unit Simplex Transformations for Parallel Distributed Optimization Problems," *IEEE Trans. Neural Networks*, Vol. 3, No. 1, pp.108–114, 1992.

Given a probability model for the data in the image, each region model can be specified by a likelihood term of the form P(pixel value|parameters), or, for the upscaled image by $P(\hat{p}_{kl}|\mu_{kl}^m)$, where the parameters $\mu_{kl}^m$ are constrained according to Eq. (1). In particular, the pixel at location (k,l) is classified as belonging to region m* if:

$$m^* = \underset{m, \chi, \mu_{ij}^m \in [\mu_m^{low}, \mu_m^{hi}]}{\operatorname{argmax}} P(\hat{p}_{kl} | \mu_{kl}^m) \quad (12)$$

These hypothesis tests can be collectively realized over all pixels by minimizing the following objective function:

$$H_0(c, \mu; \hat{p}) = -\sum_{kl} \sum_{m=0}^{M-1} (c_{kl}^m + \varepsilon) \log P(\hat{p}_{kl} | \mu_{kl}^m), \quad (13)$$

where $\varepsilon$ is an arbitrary positive bias added to prevent gradients of the above function going to zero during optimization.

The above minimization is subject to smoothness, region continuity and edge constraints as presented in section B. Incorporation of these constraints yields the following minimization:

$$H(c, \mu, \chi, h, v; \hat{p}_{kl}) = H_0(...) + \sum_{m=0}^{M-1} \sum_{i=1}^{5} \lambda_i^m H_i(...), \quad (14)$$

where $\lambda_i^m$ are Lagrange multipliers, and the $H_i$'s are as defined in section B.

Eq. (14) is optimized using a stochastic gradient descent algorithm. Since the gradient terms only involve neighboring pixels (for an upscale factor of 2), it is suitable for block-based processing and can effectively exploit massively parallel hardware to accelerate optimization. It should be noted that the reconstruction operations/steps (e.g., steps 501–503 of FIG. 5) occur jointly (i.e., simultaneously) as a result of iteratively optimizing the global optimization function in Eq. (14). The joint optimization formulation embodied in Eq. (14) advantageously circumvents the "chicken-and-egg" problem of region identification and pixel smoothing.

D. Implementations and Effects

Figure 7:
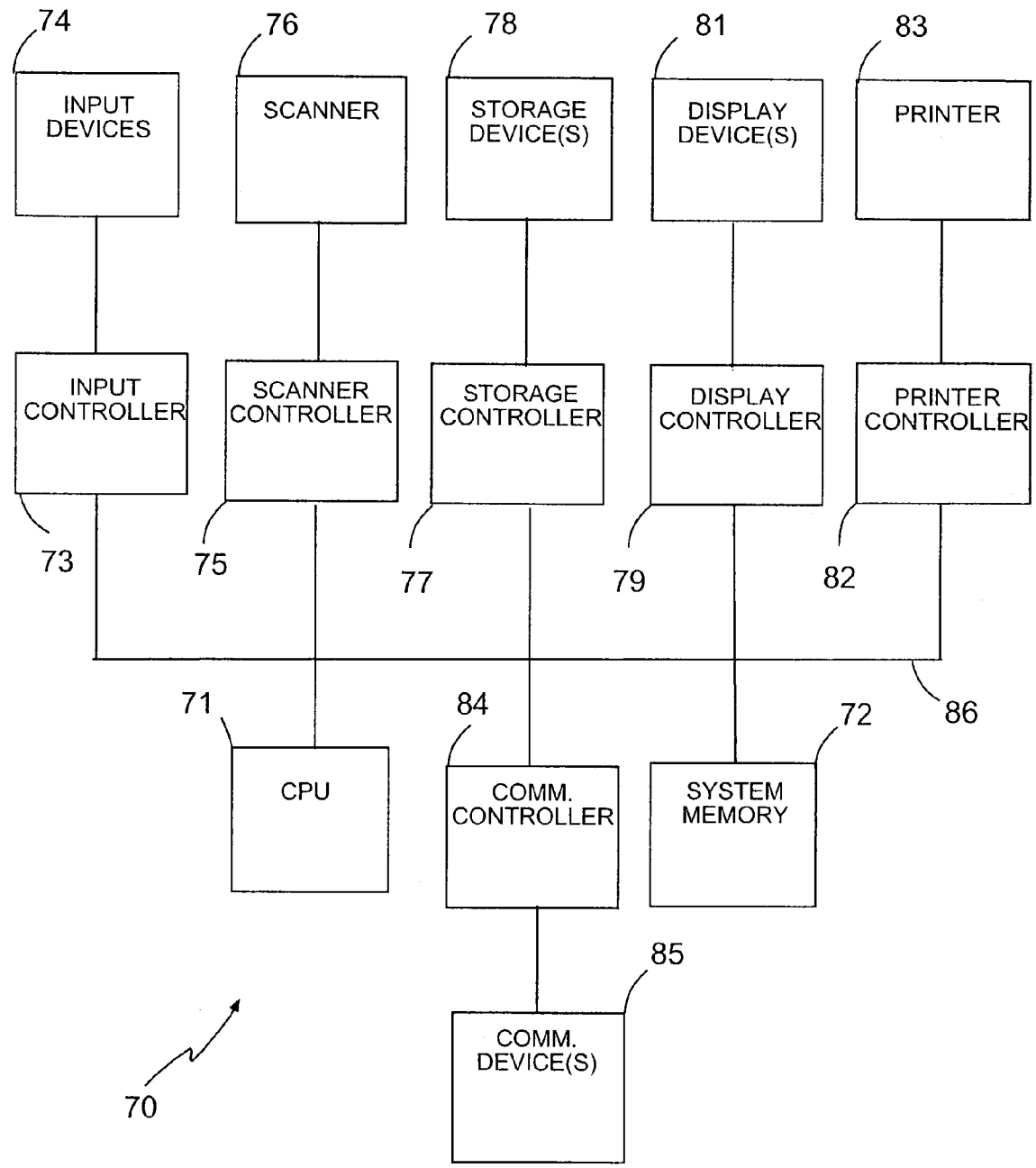
FIG. 7 is a block diagram of an exemplary image processing system which may be used to implement the algorithm of the present invention.

The algorithm of the present invention may be conveniently implemented in software which may be run on an image processing system 70 of the type illustrated in FIG. 7. The image processing system is described below in the context of a computer with peripheral devices including a printer and scanner. This is but one example of an image processing system in which the algorithm of this invention may be incorporated. The algorithm may also be embodied in a photocopier.

As illustrated in FIG. 7, the system includes a central processing unit (CPU) 71 that provides computing resources and controls the system. CPU 71 may be implemented with a microprocessor or the like, and may also include a graphics processor and/or a floating point coprocessor for mathematical computations. System 70 further includes system memory 72 which may be in the form of random-access memory (RAM) and read-only memory (ROM).

A number of controllers and peripheral devices are also provided, as shown in FIG. 7. Input controller 73 represents an interface to one or more input devices 74, such as a keyboard, mouse or stylus. There is also a controller 75 which communicates with a scanner 76 or equivalent device for digitizing documents including images to be processed in accordance with the invention. A storage controller 77 interfaces with one or more storage devices 78 each of which includes a storage medium such as magnetic tape or disk, or an optical medium that may be used to record programs of instructions for operating systems, utilities and applications which may include embodiments of programs that implement various aspects of the present invention. Storage device(s) 78 may also be used to store data to be processed in accordance with the invention. A display controller 79 provides an interface to a display device 81 which may be a cathode ray tube (CRT), thin film transistor (TFT) display or video player. A printer controller 82 is also provided for communicating with a printer 83 for printing documents including images processed in accordance with the invention. A communications controller 84 interfaces with a communication device 85 which enables system 70 to connect to remote devices through any of a variety of networks including the Internet, a local area network (LAN), a wide area network (WAN), or through any suitable electromagnetic carrier signals including infrared signals.

In the illustrated system, all major system components connect to bus 86 which may represent more than one physical bus.

Depending on the particular application of the invention, various system components may or may not be in physical proximity to one another. For example, the input data (e.g., the input image to which upscaling algorithm is to be applied) and/or the output data (e.g., the output image to which the algorithm has been applied) may be remotely transmitted from one physical location to another. Also, a program that implements various aspects of this invention may be accessed from a remote location (e.g., a server) over a network. Such data and/or program may be conveyed through any of a variety of machine-readable medium including magnetic tape or disk or optical disc.

While the present invention may be conveniently implemented with software, a hardware implementation or combined hardware/software implementation is also possible. A hardware implementation may be realized, for example, using ASIC(s), digital signal processing circuitry, or the like. As such, the claim language "machine-readable medium" further includes hardware having instructions for performing the required processing hardwired thereon. Also, the "means" language used in the claims covers appropriately configured processing devices, such as instruction-based processors including CPUs, ASICs, digital processing circuitry, or the like.

With these implementation alternatives in mind, it is to be understood that the figures and accompanying description provide the functional information one skilled in the art would require to write program code (i.e., software) or to fabricate circuits (i.e., hardware) to perform the processing required.

As the foregoing description demonstrates, the present invention provides an effective algorithm for upscaling images that have a few distinct colors. By providing a solution that jointly optimizes several constraints at multiple levels of image abstraction, the algorithm of this invention yields excellent image reconstruction quality.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for processing an image signal, comprising the steps of:
    (a) subdividing the image signal into a plurality of distinct regions, including an upper region and a lower region, and at least one transition zone between the upper and lower regions;
    (b) constructing a plurality of separate curves, one for each region;
    (c) smoothing each curve independently of the other curves; and
    (d) reconstructing the image signal from the smoothed curves such that the reconstructed image signal has no segment in any transition zone.

2. An apparatus for performing the method of claim 1.

3. The apparatus of claim 2, wherein the apparatus comprises one of a computer, a printer, or a photocopier.

4. A machine-readable medium conveying a program that implements the method of claim 1.

5. A method for processing an image signal, comprising the steps of:
   - (a) subdividing the image signal into a plurality of distinct regions, including an upper region and a lower region, and at least one transition zone directly between the upper and lower regions;
   - (b) constructing a plurality of separate curves, one for each region comprising: identifying each location where the image signal crosses an upper boundary, dividing the upper region and the transition zone, and identifying each location where the image signal crosses a lower boundary dividing the transition zone and the lower region;
   - (c) smoothing each curve independently of the other curves; and
   - (d) reconstructing the image signal from the smoothed curves such that the reconstructed image signal has no segment in any transition zone.

6. The method of claim 5, wherein in step (b) the curve in the upper region assumes the signal value when the signal is in the upper region and assumes the value of the upper boundary when the signal is in either the transition zone or the lower region, and wherein the curve in the lower region assumes the value of the lower boundary when the signal is in either the upper region or the transition zone and assumes the signal value when the signal is in the lower region.

7. The method of claim 6, wherein the reconstructing of the image signal in step (d) further comprises applying a cutting function to the smoothed curves at a location within each interval where the image signal is in the transition zone.

8. An apparatus for performing the method of claim 5.

9. The apparatus of claim 8, wherein the apparatus comprises one of a computer, a printer, or a photocopier.

10. A machine-readable medium conveying a program that implements the method of claim 5.

* * * * *